(12) United States Patent
Weng

(10) Patent No.: US 6,317,347 B1
(45) Date of Patent: Nov. 13, 2001

(54) VOLTAGE FEED PUSH-PULL RESONANT INVERTER FOR LCD BACKLIGHTING

(75) Inventor: Da Feng Weng, Yorktown Heights, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/684,195

(22) Filed: Oct. 6, 2000

(51) Int. Cl.$^7$ .................. H02M 7/538; H05B 37/02
(52) U.S. Cl. ................. 363/134; 363/25; 315/219
(58) Field of Search .................. 363/24, 25, 56.06, 363/56.07, 56.08, 133, 134; 315/209 R, 219, 221, 225, 226

(56) References Cited

U.S. PATENT DOCUMENTS

| | | | |
|---|---|---|---|
| 3,703,677 | * 11/1972 | Farrow | 323/25 |
| 4,583,026 | * 4/1986 | Kajiwara et al. | 315/226 |
| 5,495,405 | * 2/1996 | Fujimura e tal. | 363/133 |
| 5,818,172 | 10/1998 | Lee | 315/86 |
| 5,822,201 | * 10/1998 | Kijima | 363/25 |
| 6,008,589 | * 12/1999 | Deng et al. | 315/209 R |
| 6,040,662 | * 3/2000 | Asayama | 315/291 |

* cited by examiner

Primary Examiner—Matthew Nguyen

(57) ABSTRACT

An inverter circuit for supplying power to a lamp. The circuit comprises a DC voltage supply source. The circuit also comprises a transformer having a primary and a secondary winding. The secondary winding is coupled to the lamp and the primary winding is coupled to the DC supply source. The circuit also comprises a pair of inductors coupled in series to opposite ends of the primary winding. A capacitor couples the inductors together. The circuit is configured such that the pair of inductors, in conjunction with the capacitor, alternately resonate to provide an AC current supply source to the lamp. The circuit further comprises a pair of switches which alternately turn "on" and "off", thereby causing the pair of inductors to alternately resonate. A control driver is coupled to the pair of switches and is configured to alternately turn on and off the pair of switches. Advantageously, the control driver comprises a PWM control driver. Preferably, the primary winding includes a transformer tap that defines a first section and a second section, and the DC supply source is coupled to the primary winding.

16 Claims, 10 Drawing Sheets

VOLTAGE FEED PUSH-PULL RESONANT INVERTER FOR LCD BACKLIGHTING

FIELD OF THE INVENTION

The present invention is directed to LCD back lighting. More particularly, the invention is directed to a voltage feed push-pull resonant inverter that permits improved dimming performance.

BACKGROUND OF THE INVENTION

There has been an ever increasing demand for LCD displays within the past few years. Such displays are being employed by all sort of computer devices including flat display monitors, personal wireless devices and organizers, and large public display boards.

One disadvantage with the commercially available LDC displays is the dynamic range of the dimming control. Typically, LCD displays employ a backlighting arrangement which includes a cold cathode flourescent lamp, CCFL, that provides light to the displayed images. The dimming range of the available LCD backlight ranges from 100% to about 30% of the total lumen value. However, as the demand for better quality displays is increasing, and as many flat panel display monitors are taking the place of conventional CRT monitors, there is a need to increase the dimming range from 100% to about 10% or even 5% of the total lumen value. The increased dimming range provides for a remarkably improved image quality.

Another advantage of a wider dimming range is power savings. In many portable systems, such as wireless devices and personal digital assistants such as personal organizers, there is a considerable need for designs that save more battery power over longer periods of time before recharging. An expanded dimming range allows for more power conservation in the battery.

One of the reasons for the limited dimming range in the current LCD backlight systems is the driver circuitry that drives the CCFL lamp. Typically, the lamp is driven by a DC voltage source via an inverter circuit. Two major topologies for driving CCFL lamp include a half bridge inverter and a buck power stage plus current-feed push-pull inverter. In both topologies a transformer is employed to increase the input voltage source from few volts (in the order of 6–20 volts) to few hundreds of volts (in the order of 600 to 1800 volts). The circuitry coupled to the primary windings of the transformer is employed to provide a voltage signal as a voltage source, while the circuitry coupled to the secondary winding of the transformer drives the lamp.

One shortcoming of a half bridge inverter stems from the use of the low input voltage source that drives the inverter. Due to this low input voltage source, the half bridge inverter needs a high turn-ratio transformer to step up the output voltage. However, the efficiency of the driver decreases with the increase in the amplitude of the current in the primary circuit.

Furthermore, because the secondary circuit includes a ballast capacitor that is coupled to the lamp in series, the output current provided by the secondary winding in addition to a real component would include a reactive component, which is not used for illuminating the lamp. As a result the efficiency decreases.

One disadvantage with the buck power stage current-feed push-pull inverter is the use of two power stages; the buck stage and the push-pull inverter stage. Each stage contributes to the decrease in efficiency. For example, if the efficiency of the buck stage is about 90% and the efficiency of the current feed push-pull inverter is also about 90%, the combined efficiency of the system reduces to about 81%.

In addition, in order to achieve dimming, it is necessary to vary the voltage provided at the buck stage. However, the primary portion of the buck power stage plus current feed push-pull inverter employs a magnetizing inductance, and as a result it behaves as a voltage source. This behavior, in turn, causes the secondary portion of the inverter to act as a voltage source also. During dimming, as the voltage source level decreases, the impedance of the lamp increases, causing variation in the voltage level. As the dimming increases beyond a certain point in the total output lumen of the lamp, a flickering in the lamp becomes noticeable.

Thus, there is a need for an LCD backlight driving circuit that overcomes the disadvantages of the topologies described above, and provides a substantially wider dimming range as compared with those topologies.

SUMMARY OF THE INVENTION

According to one embodiment, the present invention relates to an inverter circuit for supplying power to a lamp. The circuit comprises a DC voltage supply source. The circuit also comprises a transformer having a primary and a secondary winding. The secondary winding is coupled to the lamp and the primary winding is coupled to the DC supply source. The circuit also comprises a pair of inductors coupled in series to opposite ends of the primary winding. A capacitor couples the inductors together. The circuit is configured such that the pair of inductors, in conjunction with the capacitor, alternately resonate to provide an AC current supply source to the lamp.

The circuit further comprises a pair of switches which alternately turn "on" and "off", thereby causing the pair of inductors to alternately resonate. A control driver is coupled to the pair of switches and is configured to alternately turn on and off the pair of switches. Advantageously, the control driver comprises a PWM control driver. Advantageously, the primary winding includes a transformer tap that defines a first section and a second section, and the DC supply source is coupled to the primary winding.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings, in which like reference characters denote similar elements throughout the several views.

It is to be understood that the drawings are not necessarily drawn to scale, but that they are merely conceptual in nature.

DETAILED DESCRIPTION OF THE DRAWINGS

One way to avoid the flickering described above in connection with buck power stage current feed push pull inverters as described above, is to drive the inverter switches of the inverter by a pulse width modulation signal. For such an arrangement, it is possible to achieve dimming by varying the duty cycle of the pulse signal. However, because the voltage level remains the same during the periods that the pulse is "on" the lamp does not experience a change in its impedance value for a wide range of dimming levels.

Figure 1:
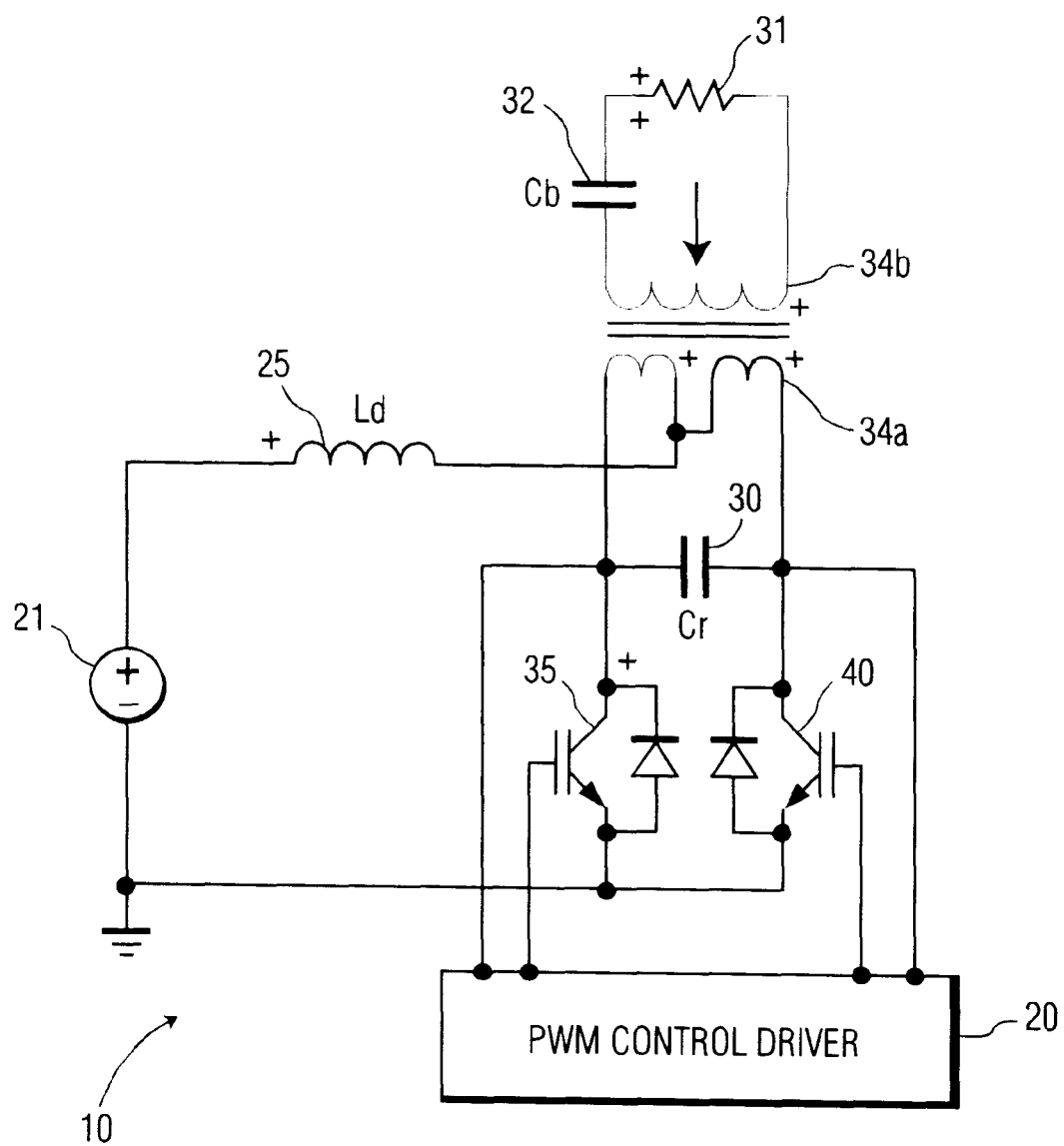
FIG. 1 is a diagram that illustrates a current feed inverter which employs a PWM control driver, in accordance with one embodiment of the invention.

FIG. 1 is a diagram of a circuit that illustrates a current-feed inverter circuit 10 employing PWM control, which comprises a DC voltage supply source 21 which is coupled to current-feed inductor 25 in accordance with one embodiment of the invention. Current-feed inductor 25 is coupled to primary winding 34a of transformer 34. Secondary winding 34b of transformer 34 is coupled to capacitor 32 and to lamp 31.

A pair of switches 35 and 40 are coupled to opposite ends of primary winding 34a. Coupled between the switches is capacitor 30. PWM control driver 20 is coupled to, and configured to control the operation of, switches 35 and 40. In addition, PWM control driver 20 is coupled at the two electrodes of capacitor 30. Basically, a current feed inverter 10 employs a PWM control driver 20 in order to provide average power regulation. Thus, it is possible to achieve variable dimming by varying the duty cycle of the PWM pulse. The current-feed push-pull inverter operation will turn "on" and "off" at a rate of 170 Hz.

It is noted that one advantage of employing a PWM control is that during the time the pulse is "on" the maximum voltage is fed to the transformer, which alleviates the problems associated with impedance variation during dimming as explained above in reference with buck power stage current-feed push-pull inverters.

Figure 2A:
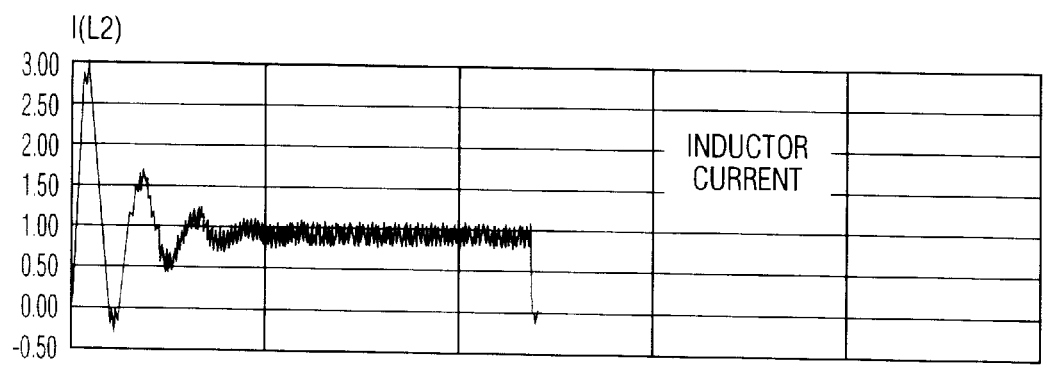
FIGS. 2(a) and 2(b) are waveform diagrams that illustrate the inductor current and the load current, respectively, in PWM current feed inverter of FIG. 1.
Figure 2B:
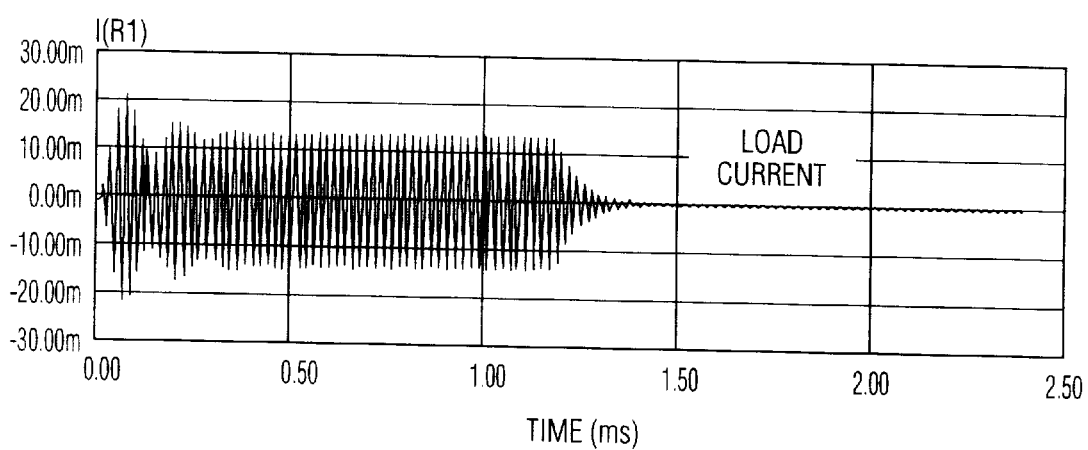

Current-feed inductor 25 converts input DC voltage to a DC current. Furthermore, the transformer magnetizing inductance (not shown) of transformer winding 34a is coupled in parallel with resonant capacitor 30 and resonates with resonant capacitor 30 as switches 35 and 40 alternately turn "on" and "off." As a result, during PWM control, current-feed inductor 25 experiences a large overshoot current or transition. This leads to a substantially longer transition from the overshoot to a steady state condition. FIGS. 2(a) and 2(b) are waveform diagrams that illustrate the inductor current and the load current respectively. These conditions have an adverse effect on the life of the lamp.

A disadvantage with this arrangement however, is the input DC inductor in the primary circuit. The inductor limits the flow of current changes in response to the switching cycles and as such lead to current overshoot. This overshoot in turn can cause light fluctuations in the lamp. As explained before, transformer magnetizing inductance and capacitor 30 are coupled in parallel and as a result cause the primary portion of inverter 10 to function as a voltage source. As such the secondary portion of inverter 10 functions as a voltage source also. However, in order to maintain a steady current supply to lamp 31, it is necessary that the secondary portion of inverter 10 function as a current source. To this end, ballast capacitor 32 is employed in series with lamp 31. However, the presence of capacitor 32 provides an additional reactive component to the power generated by the secondary winding of transformer 34, which in turn decreases the efficiency of the inverter.

Figure 3:
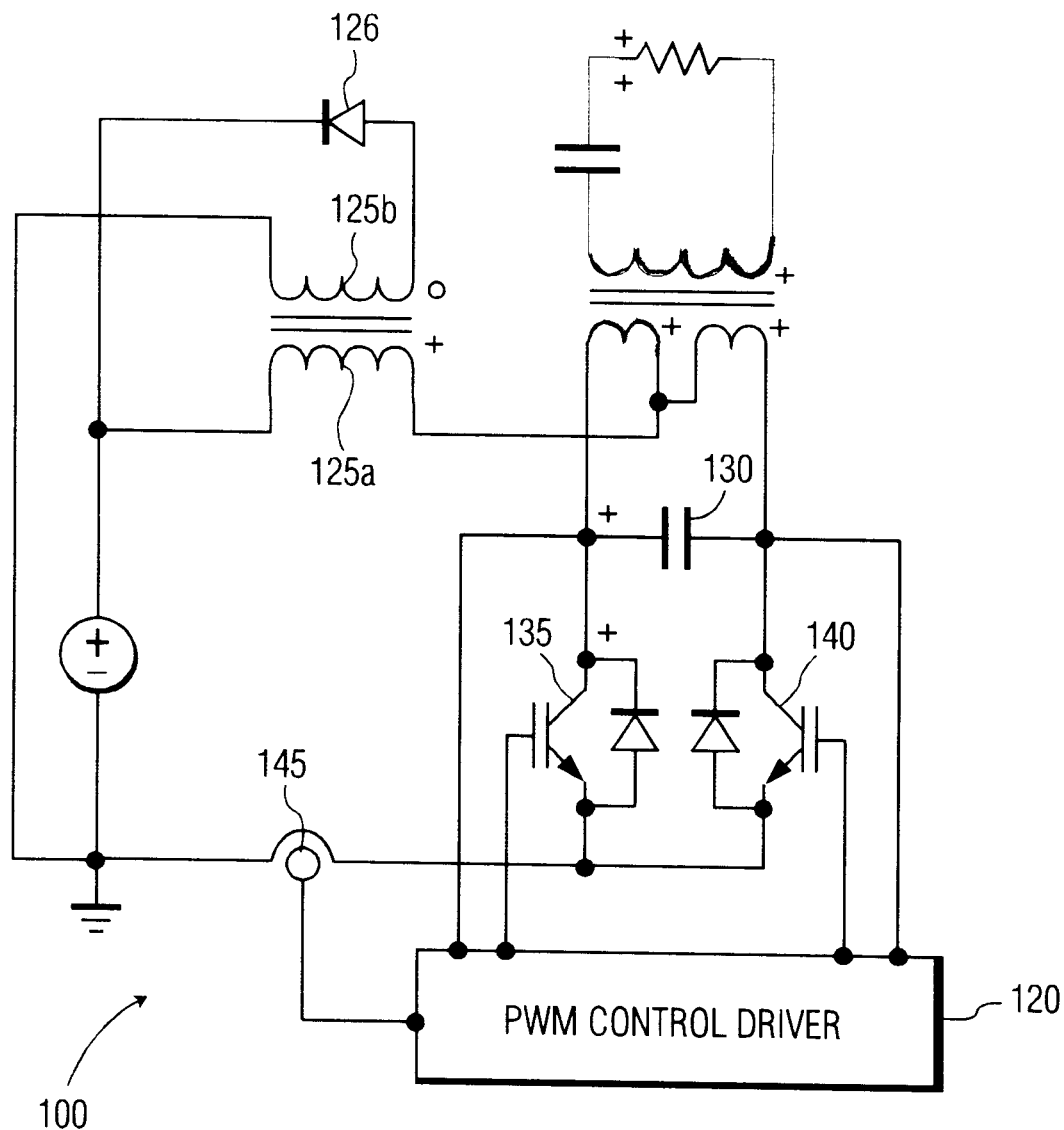
FIG. 3 is a diagram that illustrates a current feed inverter which employs a current mode control topology, in accordance with another embodiment of the invention.

In order to damp the overshoot current generated in inductor 25, a current mode control topology is employed. FIG. 3 is a diagram that illustrates basic current feed inverter 100, which employs a current mode control topology. In this case, inductor 125 has two windings, namely inductor winding 125a and inductor winding 125b. Inductor winding 125b is coupled to diode 126 and provides a path to release the stored energy of the inductor back to the input source. Current sensor 145 is used to detect the current level in inductor 125. Current sensor 145 provides feedback to PWM control driver 120, which controls the turning "on" and "off" of switches 135 and 140.

Figure 4A:
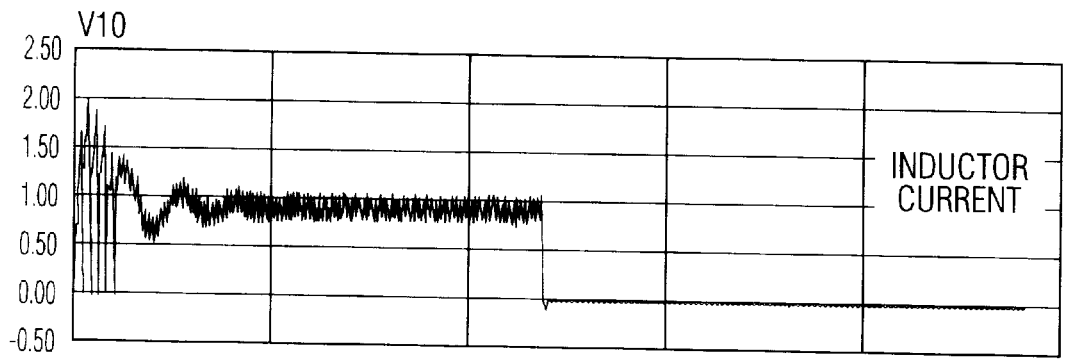
FIGS. 4(a) and 4(b) are waveform diagrams that illustrate the inductor current and the load current, respectively, in the embodiment illustrated in FIG. 3.
Figure 4B:
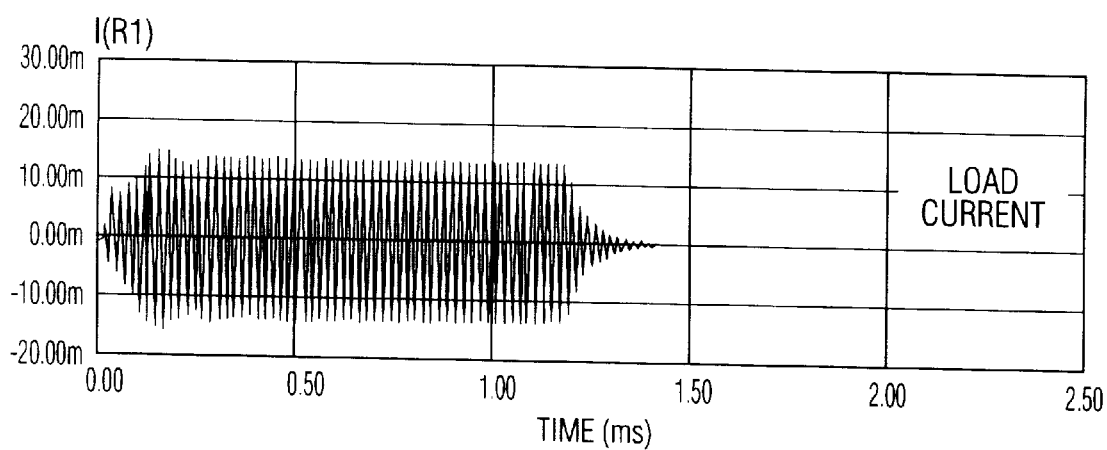

FIGS. 4(a) and 4(b) are waveform diagrams that illustrate the inductor current and the load current respectively for the inverter having current mode control, as shown in FIG. 3. As shown in these diagrams, the overshoot of the inductor current can be damped. However, the transition process from an unsteady state to steady state may still be long for certain applications.

Figure 5:
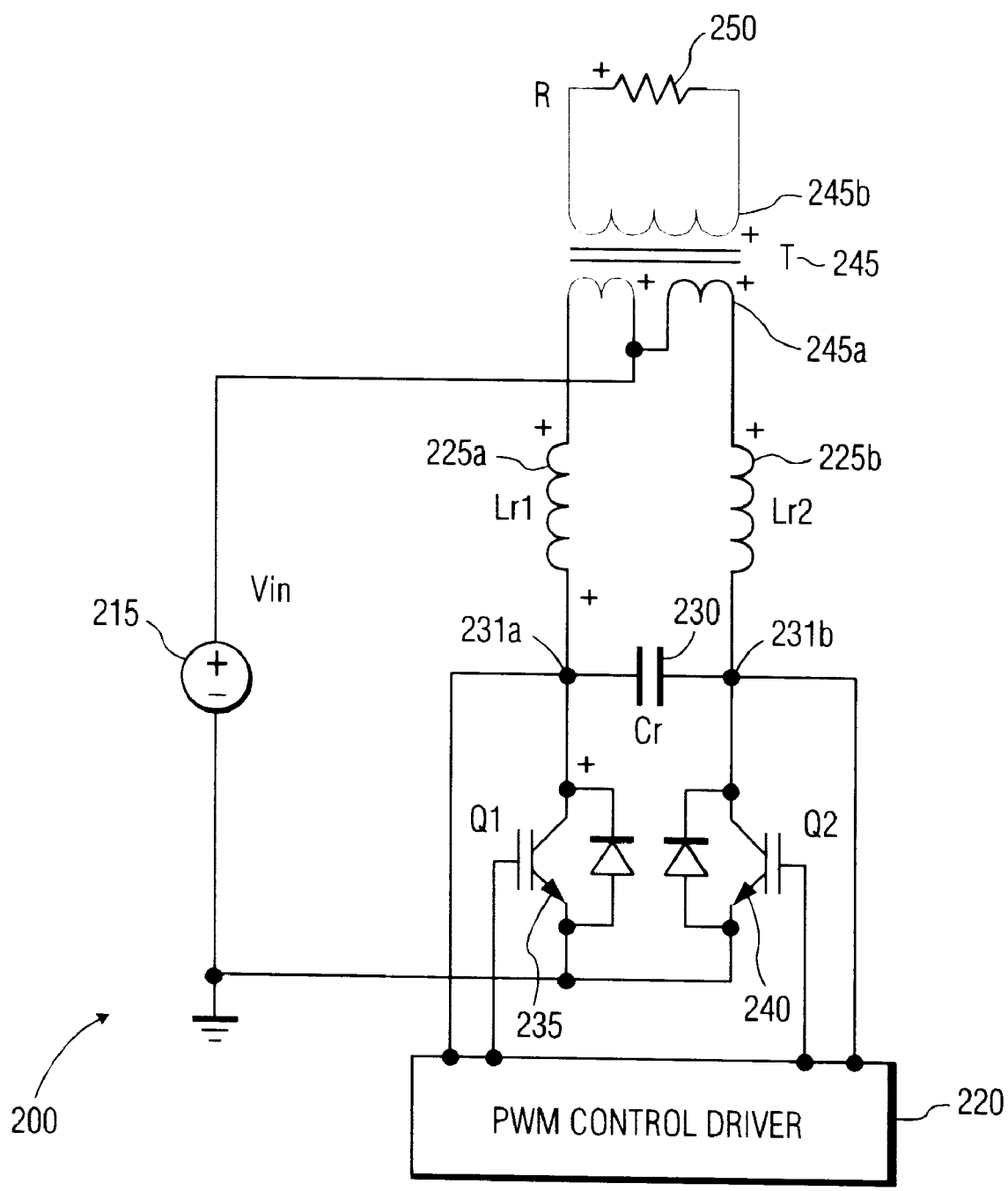
FIG. 5 is a diagram that illustrates an inverter circuit topology, according to one embodiment of the present invention.

As previously mentioned, the present invention is directed to an LCD backlighting system that provides enhanced dimming capabilities. FIG. 5 is a diagram that illustrates an inverter circuit topology according to another embodiment of the present invention. According to this embodiment, PWM control driver 220 is coupled to switches 235 and 240. A pair of inductors, namely inductor 225a and inductor 225b, are also coupled to switches 235 and 240 via nodes 231a and 231b, respectively. Inductors 225a and 225b provide a boost function, as will be explained in further detail below. In addition, they provide a resonant inductance function. Nodes 231a and 231b are also coupled to PWM control driver 220. Coupled between nodes 231a and 231b is a resonant capacitor 230.

Voltage supply source 215 provides a voltage signal to primary winding 245a. Coupled between inductors 225a and 225b is primary winding 245a of transformer 245. Secondary winding 245b of transformer 245 is coupled to the load, which is shown herein as resistor 250 having a resistance R. Transformer 245 operates to combine the two half cycle resonant currents and to output the whole resonant current from the secondary winding of the transformer.

As illustrated in FIG. 5 the primary portion of inverter 200 includes inductors 225a and 225b operating in series with resonant capacitor 230. As a result the primary portion of inverter 200 functions as a current source. To that end, the secondary portion of inverter 200 also functions as a current source. Hence, the secondary portion of inverter 200 does not require a ballast capacitor. Furthermore, the value of inductance of inductors 225a and 225b is considerably smaller than the required inductance in FIG. 1. As such, the primary portion of inverter 200 does not experience current overshoots as described above.

With respect to the operation of inverter circuit 200, before switch 235 turns on, the voltage on resonant capacitor 230 is zero. In addition, before switch 235 turns on, the currents in resonant inductors 225a and 225b have a maximum amplitude. All energy is stored in inductors 225a and 225b or else is outputted to the load.

Because the voltage on resonant capacitor 230 is zero, switch 240 can be turned off in a zero voltage switching condition. Similarly, switch 235 can be turned on in a zero voltage switching condition. The input DC voltage signal $V_{in}$ from voltage supply source 215 generates a charge loop comprising voltage supply source 215, reflected resistor 250, inductor 225a and switch 235. As the current from DC voltage source 215 increases from zero, the current in inductor 225a changes direction gradually from a negative signal, to zero, and then to a positive signal. The current in inductor 225b increases at first due to the zero voltage at resonant capacitor 230, but will then resonantly decrease in order to release its stored energy to capacitor 230.

As a result, the voltage on resonant capacitor 230 increases from zero to its maximum value. Because inductor 225a is in series with DC voltage supply source 215 (i.e.— through reflected resistor 250, and switch 235), inductor 225a provides a boost function. In other words, DC voltage supply source 215 feeds energy directly to resonant capacitor 230 through inductor 225a.

As the current in inductor 225b decreases to zero, the voltage across resonant capacitor 230 reaches its maximum value. Additionally, the current in inductor 225a reaches its maximum positive value, which remains constant for a short time thereafter. Resonant capacitor 230 resonates with inductor 225b through reflected resistor 250. The energy stored in resonant capacitor 230 is released to inductor 225b as well as to reflected resistor 250.

The output current of the DC voltage supply source 215 decreases gradually. Resonant capacitor 230 provides the required energy to inductor 225a. The current in inductor 225b thereby increases from zero to its maximum negative value. Since resonant capacitor 230 does not have enough energy to provide to inductor 225a, the current of the DC voltage supply source begins to increase. The current in inductor 225b still decreases and the voltage on capacitor 230 decreases to zero.

As the voltage on capacitor 230 reaches zero, switch 235 will turn off and switch 240 will turn "on". The manner in which switch 240 turns on is similar to the manner in which switch 235 turns on, except that the above-described operation of each element in the circuit is instead performed by that element's symmetrical counterpart (inductor 225a is the symmetrical counterpart of inductor 225b, switch 235 is the symmetrical counterpart of switch 240, etc.).

During the period in which switch 235 turns on, inductor 225a is charged by DC voltage supply source 215 to store the input energy which will be used in the next half period of the circuit's resonance operation. Inductor 225b resonates with resonant capacitor 230 to generate one half of a cycle of AC current. Similarly, during the period in which switch 240 turns on, inductor 225b is charged by DC voltage supply source 215 to store the input energy which will be used in the next half period of the circuit's resonance operation. Inductor 225a resonates with resonant capacitor 230 to generate the other half cycle of AC current.

Thus, transformer 245 combines the two half cycles of AC current and outputs the AC current signal to the lamp. Because the reflected resistor R is in series with inductor 225b and resonant capacitor 230 (or with inductor 225a and resonant capacitor 230 during a second half of the operation), the current in the lamp is controlled by the resonant circuit comprising inductor 225b and capacitor 230 (or by the resonant circuit comprising inductor 225a and capacitor 230 during the second half of operation).

The inverter of the present invention, according to one embodiment thereof, provides a high frequency current source to drive the lamp. Hence, there is no need for a ballast capacitor in the output of transformer 245. As a result, transformer 245 transfers only real power from its primary winding 245a to its secondary winding 245b.

Figure 6A:
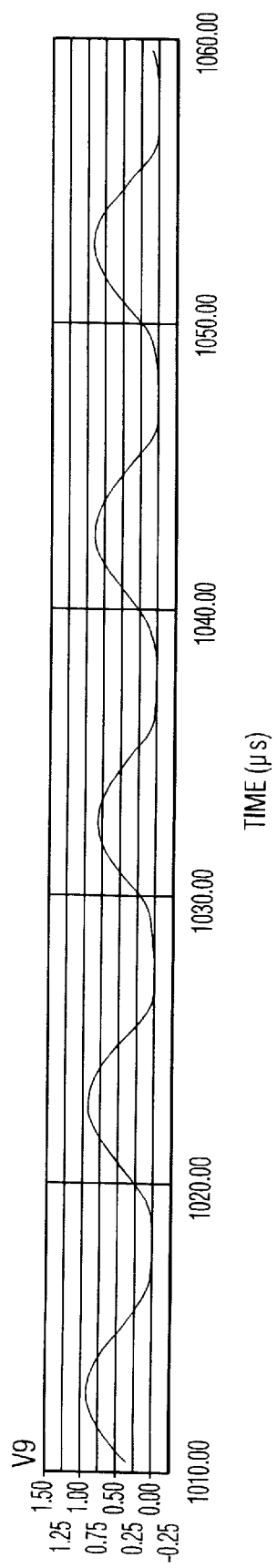
FIGS. 6(a) through 6(e) are waveform diagrams that illustrate the voltage and current signals at each elements of the circuit during its operation, according to one embodiment of the present invention.
Figure 6B:
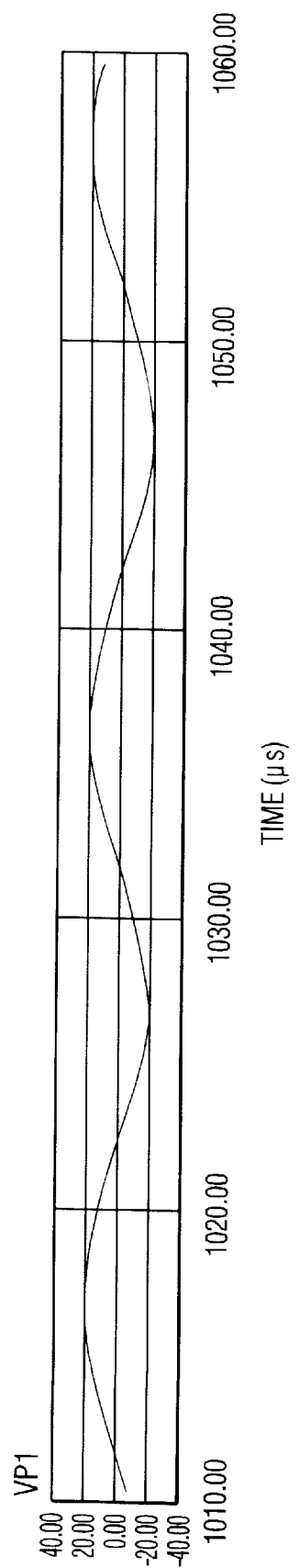
Figure 6C:
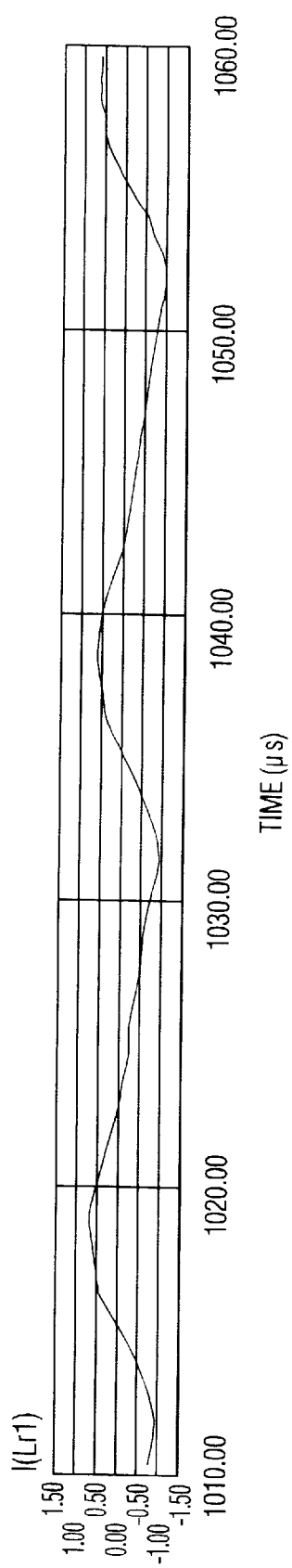
Figure 6D:
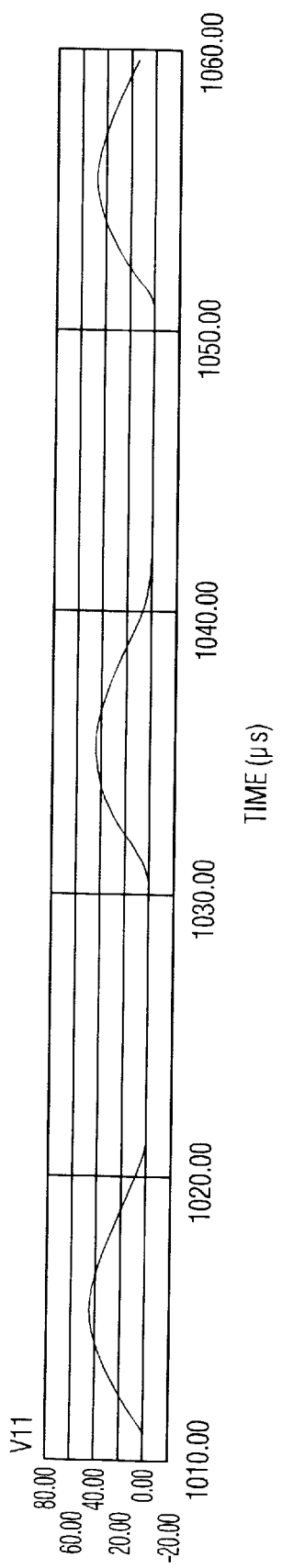
Figure 6E:
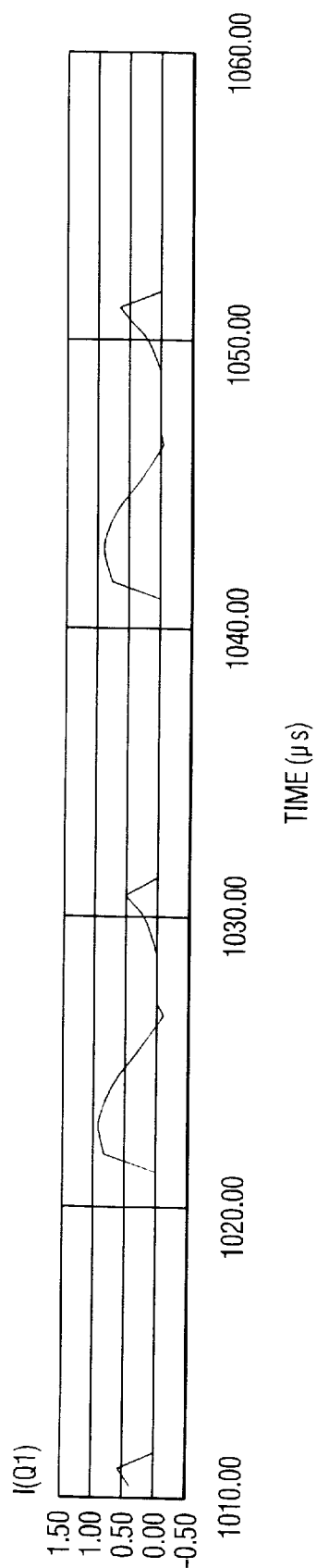

FIGS. 6(a) through 6(e) are waveform diagrams that illustrate the voltage and current signals at each element of circuit 200 during its operation. For instance, FIG. 6(a) is a waveform diagram that illustrates the input current signal at capacitor 230. FIG. 6(b) is the voltage signal on primary winding 245a of the transformer 245. FIG. 6(c) is the current signal at inductor 225a. FIG. 6(d) is the voltage signal at switch 235, while FIG. 6(e) is the current signal at switch 235.

The circuit of the present invention, in accordance with one embodiment, is also configured to operate at a high level of efficiency when employed to start the lamp. Before the lamp reaches a breakdown operation, the lamp has a high impedance. This high impedance is reflected in primary winding 245a of transformer 245, and is higher than the impedance of the primary winding's magnetizing inductance. This high impedance allows the primary portion of the inverter to exhibit a substantially high Q characteristics. The high Q behavior in turn provides for a high amplification of the input voltage, which is needed during the start up. For example, because of the reflected impedance, the voltage provided by secondary winding can exceed 2000 volts, which can cause the lamp to begin its operation in the breakdown mode.

As the lamp breaks down, the impedance of the lamp decreases causing the primary portion of the inverter to exhibit a lower Q characteristics. This in turn lowers the amplification of the input voltage, which is needed during the normal operation of the lamp.

For lamp start-up, the resonant frequency of the primary portion of inverter 200 is lower than the resonant frequency of the resonant tank during normal operation. As the lamp impedance changes from a high value to a low value, the resonant frequency of the resonant circuit will change automatically. In other words, the resonant frequency of the resonant circuit will jump from a low frequency to a high frequency. The non-linear impedance characteristics employed by the circuit of the present invention to drive the lamp contributes to the circuit's improved efficiency.

According to one embodiment of the invention, the circuit of the present invention provides improved dimming capabilities over circuits of the prior art. Rather than a dimming range of 100% to approximately 30%, as experienced by circuits of the prior art, the circuit of the present invention, according to the embodiment described above, provides a dimming range of 100% to approximately 5–10%.

According to various embodiments of the invention, this circuit has other advantageous features. For instance, the inverter provides a boost function to boost the voltage on primary winding 245a of transformer 245. The boost function enables the turn ratio of transformer 245 to be decreased, thereby increasing the efficiency of the system. In addition, the efficiency of the system is also improved by virtue of the fact that transformer 245 only transfers real power, not reactive power.

Also, because the primary portion of the inverter includes a series resonant configuration, it behaves as a current source. The inductance of the resonant inductors is sufficiently small to allow for substantially no overshoot. As a result, the conducting losses will also be low. The power switches also have the advantage that they will operate in a zero voltage switching condition. There is also no DC inductance which will limit the system response. The inverter also has a low manufacturing cost, since the system comprises a common ground for the inverter transistors without the need of level shifting circuits as implemented in prior art inverter circuits.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An inverter circuit for supplying power to a lamp, comprising:
   a DC voltage supply source;
   a transformer having a primary and a secondary winding, wherein said secondary winding is coupled to said lamp and said primary winding comprises first and second sections coupled to said DC supply source;
   first and second inductors, each coupled in series with a respective one of the first and second sections;
   first and second switches, each coupled in series with a respective one of the first and second inductors and with the DC voltage supply source;
   a capacitor coupling said first and second inductors, wherein said first and second inductors operate to alternately resonate to provide an AC current supply to said lamp when the first and second switches alternately turn on and off.

2. The circuit of claim 1, wherein said circuit comprises a control driver coupled to said first and second switches and configured to alternately turn on and off said first and second switches.

3. The circuit of claim 2, wherein said control driver comprises a PWM control driver.

4. The circuit of claim 1, wherein said DC supply source is coupled to said primary winding at a tap between said first and second sections.

5. The circuit of claim 1, wherein said first and second inductors have inductances which are sufficient to maintain a required switching frequency of the lamp.

6. A method for supplying power to a lamp with an inverter, said method comprising the steps of:
   coupling a primary winding of a transformer, having first and second sections, to a DC voltage supply source and coupling a secondary winding of said transformer to said lamp;
   coupling first and second inductors in series with respective ones of the first and second sections of said primary winding;
   coupling each of first and second switches in series with a respective one of the first and second inductors and with the DC voltage supply source;
   coupling said first and second inductors with a capacitor; and
   alternately turning the first and second switches on and off such that the first and second inductors alternately resonate to provide an AC current supply to said lamp.

7. The method of claim 6, wherein said method comprises the steps of:
   coupling to said first and second switches a control driver; and
   employing said control driver to alternately turn on and off said first and second switches.

8. The method of claim 7, wherein said coupling step comprises coupling to said first and second switches a PWM control driver.

9. The method of claim 6, wherein said method comprises the step of coupling said DC supply source to a tap between said first and second sections of said primary winding.

10. The method of claim 9, wherein said first and second inductors have inductances which are sufficient to maintain a required switching frequency of the lamp.

11. A system for supplying power to a lamp, comprising:
    a DC voltage supply source;
    a transformer having a primary and a secondary winding, wherein said secondary winding is coupled to said lamp and said primary winding comprises first and second sections coupled to said DC supply source;
    first and second inductors each having a first end coupled to a respective one of the first and second sections and each having a second end;
    first and second switches, each coupling a respective one of the second ends of the first and second inductors to the DC voltage supply source; and
    a capacitor coupling the second ends of said first and second inductors, wherein said primary winding operates to resonate as a current source.

12. The system of claim 11, wherein said first and second switches alternately turn on and off so as to cause said first and second inductors to alternately resonate.

13. The system of claim 12, wherein said system comprises a control driver coupled to said first and second switches and configured to alternately turn on and off said first and second switches.

14. The system of claim 13, wherein said control driver comprises a PWM control driver.

15. The system of claim 11, wherein said DC supply source is coupled to said primary winding at a tap between said first and second sections.

16. The system of claim 11, wherein said first and second inductors have inductances which are sufficient to maintain a required switching frequency of the lamp.

\* \* \* \* \*